US008407278B2

(12) United States Patent
Pechanec et al.

(10) Patent No.: US 8,407,278 B2
(45) Date of Patent: Mar. 26, 2013

(54) LINK-BASED REGISTRY FEDERATION

(75) Inventors: Jiri Pechanec, Mokra-Horakov (CZ);
Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 524 days.

(21) Appl. No.: 12/712,028

(22) Filed: Feb. 24, 2010

(65) Prior Publication Data

US 2011/0208806 A1   Aug. 25, 2011

(51) Int. Cl.
*G06F 15/16* (2006.01)
(52) U.S. Cl. ........................................ 709/200
(58) Field of Classification Search .................. 709/228, 709/249
See application file for complete search history.

(56) References Cited

U.S. PATENT DOCUMENTS

| 7,814,226 | B2 * | 10/2010 | Patrick | 709/238 |
| 8,171,337 | B2 * | 5/2012 | Peters et al. | 714/6.2 |
| 8,275,985 | B1 * | 9/2012 | Narayanan et al. | 713/160 |
| 8,285,672 | B2 * | 10/2012 | Wells et al. | 707/610 |
| 2006/0173987 | A1 * | 8/2006 | Friesen et al. | 709/223 |
| 2007/0033167 | A1 * | 2/2007 | Basu et al. | 707/3 |
| 2008/0015916 | A1 * | 1/2008 | Cossey et al. | 705/7 |
| 2008/0069082 | A1 * | 3/2008 | Patrick | 370/351 |
| 2008/0069124 | A1 * | 3/2008 | Patrick | 370/401 |
| 2008/0294757 | A1 * | 11/2008 | Bachmann et al. | 709/221 |
| 2010/0251010 | A1 * | 9/2010 | Peters et al. | 714/5 |
| 2011/0107352 | A1 * | 5/2011 | Wells et al. | 719/318 |
| 2012/0016891 | A1 * | 1/2012 | Pechanec et al. | 707/752 |
| 2012/0185725 | A1 * | 7/2012 | Peters et al. | 714/6.2 |

OTHER PUBLICATIONS

Sivashanmugam et al., "Discovery of Web services in a federated registry environment", Jul. 6-9, 2004, International Conference on Web Services 2004 Proceedings IEEE, pp. 270-278.*
Li et al., "Research on Semantic-based web services registry federation", 2005, Proceedings on the 4th international conference on Grid and Cooperative Computing, pp. 202-207.*
Sommers, F., "What's New in UDDI 3.0—Part 3: Federating UDDI registries", accessed at: http://www.webservices.org/categories/technology/registry_uddi/what_s_new_in_uddi_3_0_part_3/(go)/Articles on Feb. 5, 2010, last updated Feb. 9, 2003, 3 pages.
"UDDI Version 3.0.2—UDDI Spec Technical Committee Draft, Dated 20041019", accessed at: http://uddi.org/pubs/uddi_v3.htm on Feb. 5, 2010, 245 pages.

* cited by examiner

*Primary Examiner* — Douglas Blair
(74) *Attorney, Agent, or Firm* — Lowenstein Sandler LLP (57) ABSTRACT

Some embodiments of a system and a method to implement a link-based registry federation have been presented. For instance, a registry federation having a set of registries may be stored in some storage devices. The registries may include Universal Description, Discovery, and Integration (UDDI) registries. Each registry includes one or more records. In response to a request to promote a record of a first registry of the registry federation into a second registry of the registry federation, a delegation link can be inserted into the second registry to refer to the record in the first registry, without fully replicating the record in the second registry.

23 Claims, 7 Drawing Sheets

LINK-BASED REGISTRY FEDERATION

TECHNICAL FIELD

Embodiments of the present invention relate to registry federation, and more specifically to link-based registry federation.

BACKGROUND

Currently, many businesses develop web service systems. To promote interoperability, web service standards, such as Universal Description, Discovery, and Integration (UDDI) web service standard, have been defined. Web services broadly refer to any service capable of being described by a binding template. Typically, web services are used for machine-to-machine communication, and they share much of the technology that underlies the World Wide Web, such as Transfer Control Protocol/Internet Protocol (TCP/IP), Hypertext Transfer Protocol (HTTP), and Extended Markup Language (XML).

A web service system typically includes one or more nodes. As used herein, a node broadly refers to a collection of web services, each of which implements the APIs in a predefined API set, such as a UDDI API set, and that are managed according to a common set of policies. One or more nodes may be combined to form a registry. The nodes in a registry collectively manage a particular set of data. This data may include one or more records. A registry federation is a collection of registries logically arranged in a predetermined topology, such as a tree. Multiple registries within the registry federation may cooperate with each other based on the rule that a registry can promote into an affiliate or a root registry. Conventionally, one registry can promote a record into another registry within the registry federation by copying the record to the other registry. However, the problem with this approach is that the records copied have to be kept in synchronization in all registries involved. It is generally time-consuming to copy records between the registries. Furthermore, some registries may not receive the updated records in time.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method, an apparatus, and a system to implement a link-based registry federation. The techniques disclosed herein are generally applicable to web service systems, such as Universal Description, Discovery, and Integration (UDDI) web service system.

In one embodiment, a link-based registry federation can be implemented as follows. A set of registries of the link-based registry federation is stored in some storage devices. Each registry includes one or more records. In response to a request to promote a record of a first registry of the registry federation into a second registry of the registry federation, a delegation link can be inserted into the second registry to refer to the record in the first registry, without fully replicating the record in the second registry. When a client attempts to access the linked record in the second registry, the link can be resolved and the current value of the record is obtained from the first registry. More details of some embodiments of how to implement a link-based registry federation are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "inserting" or "resolving" or "sending" or "executing" or "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1:
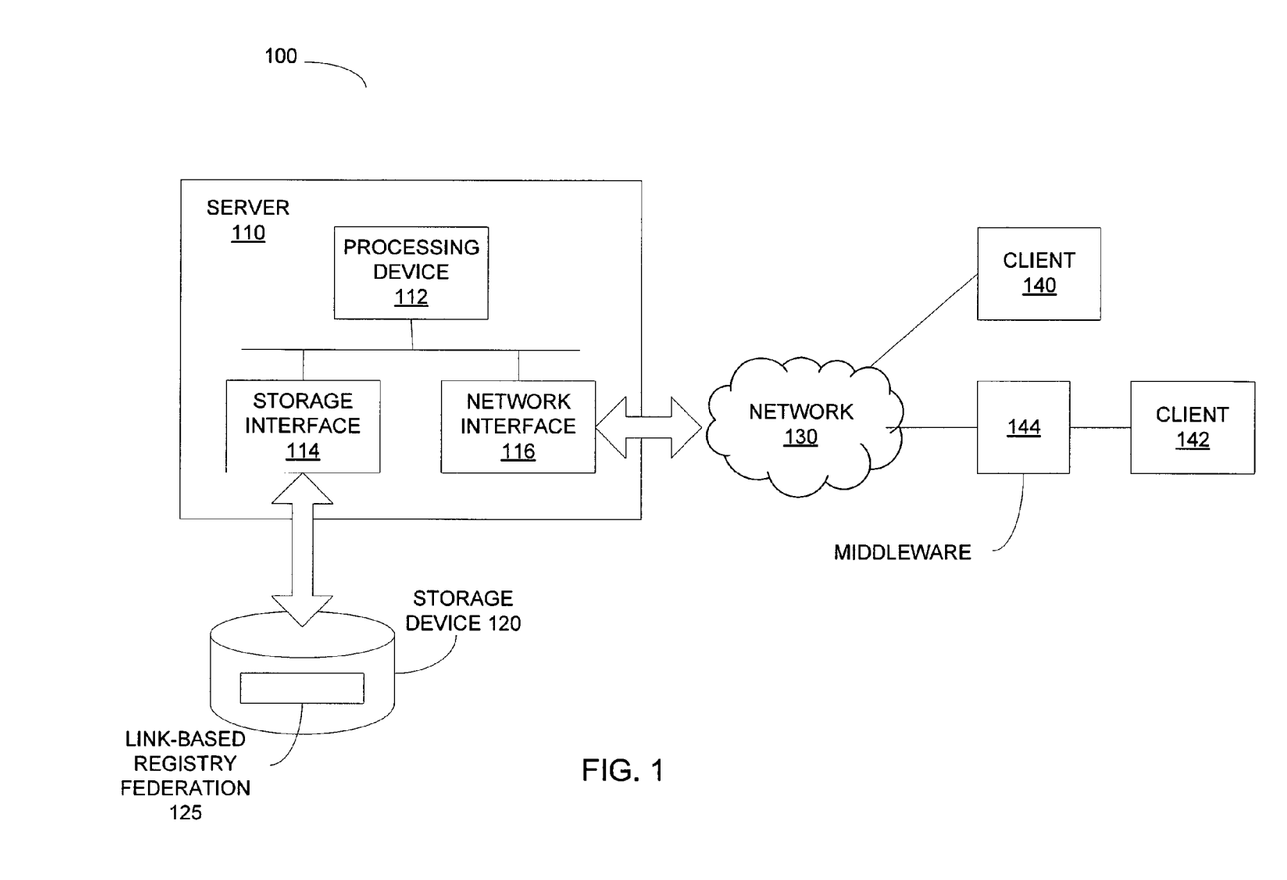
FIG. 1 illustrates one embodiment of a computing system usable in some embodiments of the invention.
Figure 4:
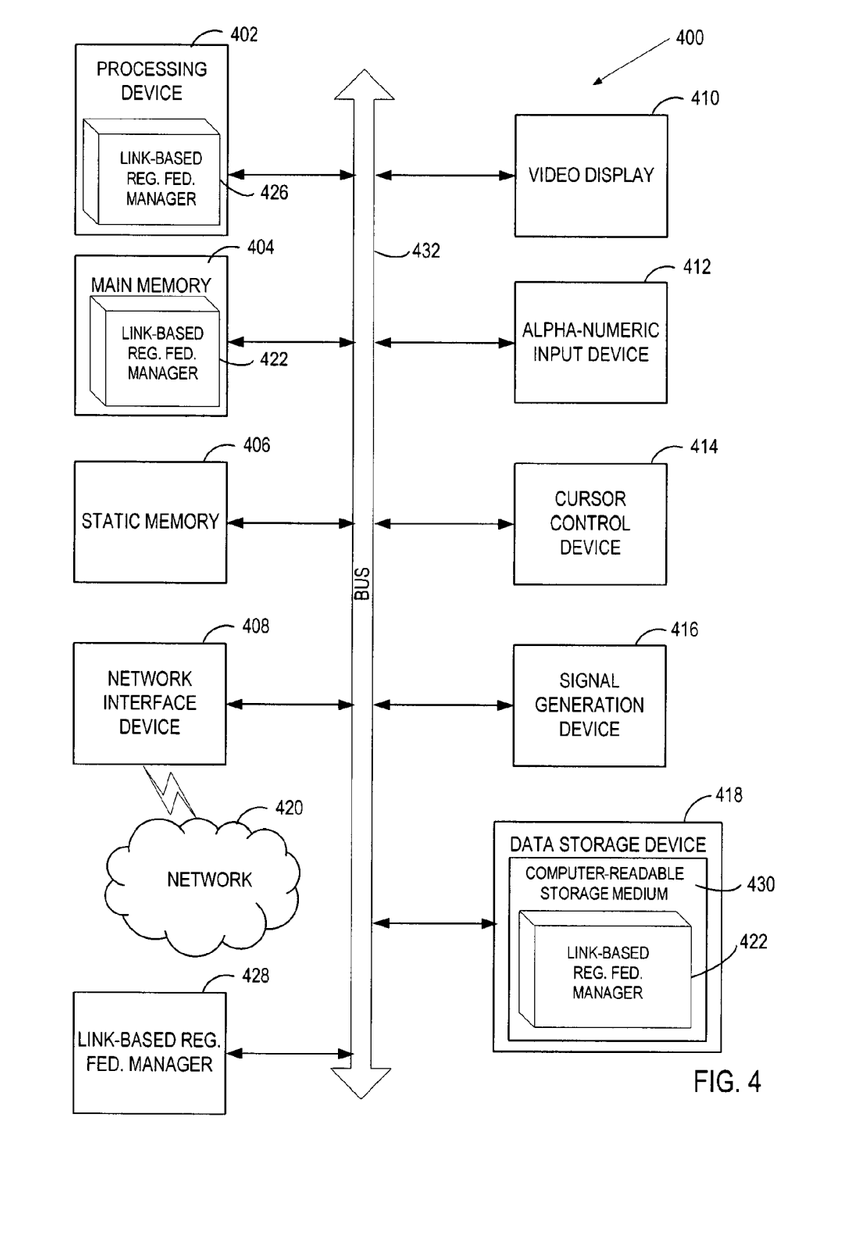
FIG. 4 illustrates a block diagram of an exemplary computing system.

FIG. 1 illustrates one embodiment of a computing system usable in some embodiments of the invention. The computing system 100 includes a server 110, a storage device 120, a network 130, a middleware 144, and some clients 140 and 142. The server 110 and clients 140 and 142 may be implemented on one or more computing machines, such as a desktop personal computer, a laptop computer, a personal digital assistant, etc. Details of one example of a computing machine are illustrated in FIG. 4. The server 110 and the client 140 are communicably coupled to each other via the network 130. The server 110 is further communicably coupled to the client 142 through the middleware 144 and the network 130. The middleware 144 may include a set of services that allow processes running on different machines to interact. Although the middleware 144 is illustrated as a standalone component in between the client 142 and the server 110 in FIG. 1, the middleware 144 may reside on different places in different embodiments. In one embodiment, at least part of the middleware 144 may reside on the server 110; in a second embodiment, at least part of the middleware 144 may reside on the client 142; in a third embodiment, at least part of the middleware 144 may reside on a machine (e.g., a server) coupled between the client 142 and the server 110. The network 130 may include various types of network, such as, for example, a public network (e.g., the Internet), a private network (e.g., a local area network), a wireless network, a wire-lined network, etc. The server 110 is also coupled to the storage devices 120. The storage device 120 may include one or more various types of machine-readable storage media, such as, optical disks, CD-ROMs, and magnetic-optical disks, magnetic or optical cards, or any type of media suitable for storing electronic data. The storage device 120 stores a link-based registry federation 125, which may be created and managed by the server 110.

In some embodiments, the server 110 includes a processing device 112, a storage interface 114, and a network interface 116. Via the storage interface 114, the server 110 may communicate with the storage device 120. Via the network interface 116, the server 110 may communicate with machines coupled to the network 130, such as the clients 140 and 142. Note that in some alternate embodiments, the server 110 further includes a storage device internally to store at least part of a link-based registry federation. To illustrate how the server 110 creates and manages the link-based registry federation 125, some examples are discussed in details below.

In some embodiments, the processing device 112 creates registries and stores records in the registries created. For instance, the registries may include UDDI registries. Furthermore, the processing device 112 may arrange the registries according to a predetermined topology to form a registry federation, such as a tree having a root registry and a number of affiliate registries. The processing device 112 stores the registry federation 125 in the storage device 120. In some instances, users may want to promote a record between registries. In general, promoting a record into a registry broadly refers to making the record accessible through or from the registry. To promote a record from a first registry into a second registry, the processing device 112 inserts a delegation link into the second registry in some embodiments. The delegation link is a reference pointing to the record in the first registry, such as an identifier of the first registry (e.g., a name of the first registry, a network address of the first registry, etc.) and an identifier of the record (e.g., a record number, a primary key of the record, etc.). Thus, unlike some conventional approaches, the processing device 112 does not have to replicate the record or copy the record in the second registry. Thus, the record promoted into the second registry may also be referred to as a linked record in the second registry. One advantage of the above approach is to reduce the time it takes to promote records between registries because copying a record from one registry to another is generally more time-consuming, especially for large records. Another advantage of the above approach is to eliminate the need to update replicated records in multiple registries whenever a record in the first registry is changed because changes to the content of a record generally do not affect delegation links referring to the record.

When a client, such as the client 140, requests to access a linked record, the delegation link may be resolved to obtain a current copy of the record for the client. In general, to resolve a delegation link broadly refers to evaluating the delegation link to determine where the record is and to retrieve a current copy of the record. Link resolution may be done by one or more devices in the system 100, such as the server 110, the clients 140-142, and/or the middleware 144. Some examples are discussed in details below with reference to FIGS. 2A-2C to illustrate link resolution in some embodiments.

Figure 2A:
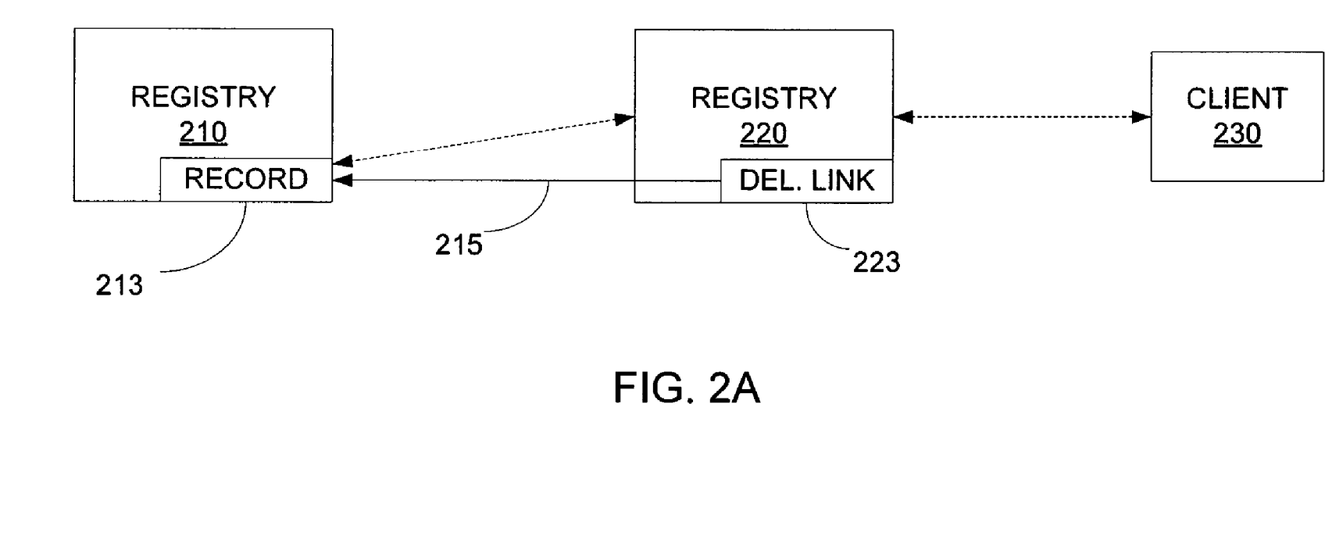
FIG. 2A illustrates one embodiment of link resolution in a link-based registry federation.

FIG. 2A illustrates one embodiment of link resolution in a link-based registry federation. In the current example, a record 213 in registry 210 has been promoted to registry 220 by insertion of a delegation link 223 into registry 220. As indicated by the arrow 215, the delegation link 223 refers to the record 213 in registry 210. The delegation link 223 may also be referred to as a linked record in registry 220. When a client 230 attempts to access the linked record 223 in registry 220, the delegation link 223 is resolved at the registry 220 by the server hosting the registry 220, such as server 110 in FIG. 1. For example, the delegation link 223 may include a network address of the registry 210 and the server may find out where the record 213 is by reading the network address. Then the server may retrieve a current copy of the record 213 from the registry 210, and send the copy of the record 213 to the client 230.

Figure 2B:
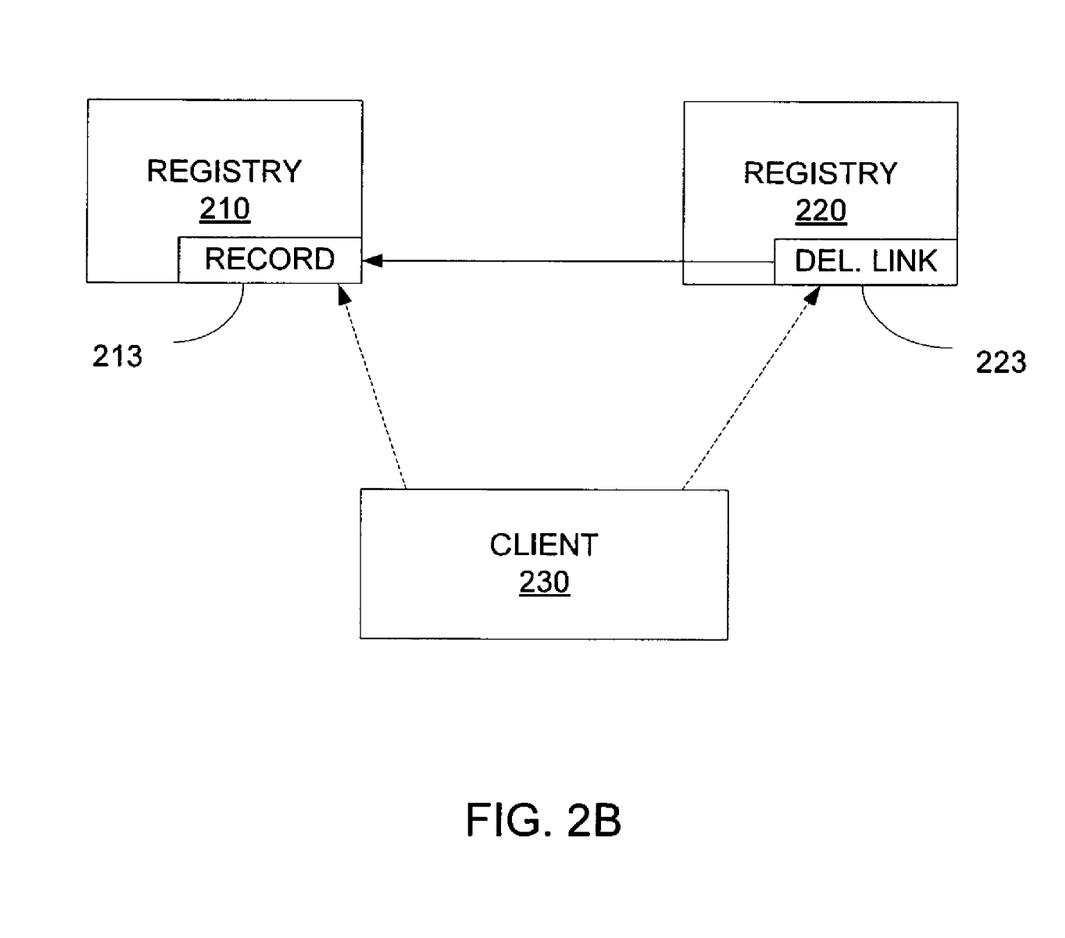
FIG. 2B illustrates a second embodiment of link resolution in a link-based registry federation.

FIG. 2B illustrates an alternate embodiment of link resolution in a link-based registry federation. In the current example, a record 213 in registry 210 has been promoted to registry 220 by insertion of a delegation link 223 into registry 220. As indicated by the arrow 215, the delegation link 223 refers to the record 213 in registry 210. When a client 230, such as client 140 in FIG. 1, attempts to access the linked record, that is, the delegation link 223, in registry 220, the delegation link 223 is returned to the client 230, and the client 230 resolves the delegation link 223 to determine that the delegation link 223 is referring to the record 213 in the registry 210. Then the client 230 obtains a copy of the record 213 from the registry 210 himself. For example, the delegation link 223 may include a network address of registry 210, and the client 230 can use the network address to access registry 210 to retrieve the record 213.

Figure 2C:
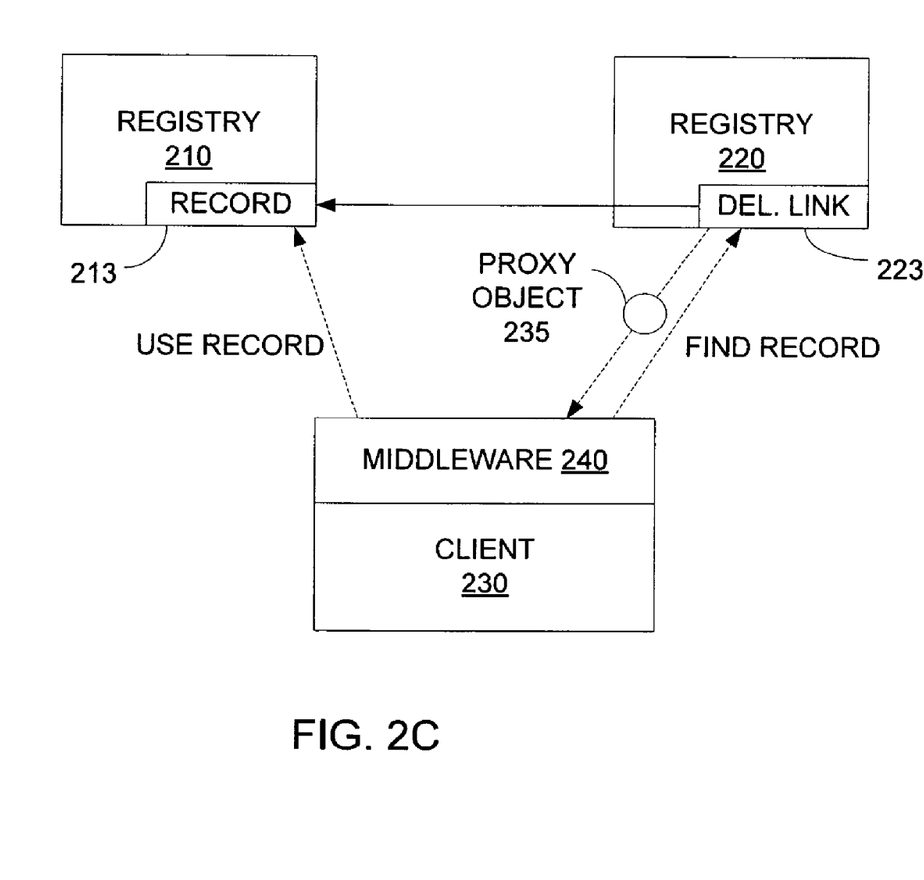
FIG. 2C illustrates a third embodiment of link resolution in a link-based registry federation.

FIG. 2C illustrates another alternate embodiment of link resolution in a link-based registry federation. In the current example, a record 213 in registry 210 has been promoted to registry 220 by insertion of a delegation link 223 into registry 220. As indicated by the arrow 215, the delegation link 223 refers to the record 213 in registry 210. When a client 230, such as client 142 in FIG. 1, attempts to access the linked record, which is the delegation link 223, in registry 220, a middleware 240 coupled to the client 230, such as the middleware 144 in FIG. 1, receives a proxy object 235. The proxy object 235 may provide a set of interfaces to allow the middleware 240 to extract the delegation link 223 from the registry 220. When the client 230 needs to process the information of the linked record of registry 220, the middleware 240 automatically resolves the proxy object 235 to determine that the delegation link 223 is pointing to the record 213. Then the middleware 240 retrieves a copy of the record 213 from the registry 210 and provides the copy retrieved to the client 230. For example, the delegation link 223 may include a network address of registry 210. The middleware 240 may extract the network address from the delegation link 223 using interfaces of the proxy object 235, and then use the network address to retrieve a copy of the record 213 from registry 210 for the client 230.

Each of the above link resolution techniques may be appropriate under different circumstances depending on various factors. For instance, the technique illustrated in FIG. 2A may ensure that clients are backward compatible with the current standard, but it may require higher performance on the server side. The second technique illustrated in FIG. 2B is substantially the opposite of the technique illustrated in FIG. 2A. In other words, the technique in FIG. 2B does not require high performance on the server side as the work of resolving the delegation link 223 is done by the client 230. But the client 230 using the technique in FIG. 2B may not be backward compatible. The client 230 using third technique illustrated in FIG. 2C is backward compatible, and not so demanding on the server, but it uses a proxy object to be processed by the middleware 240, so it may not work directly with registry records.

Figure 3A:
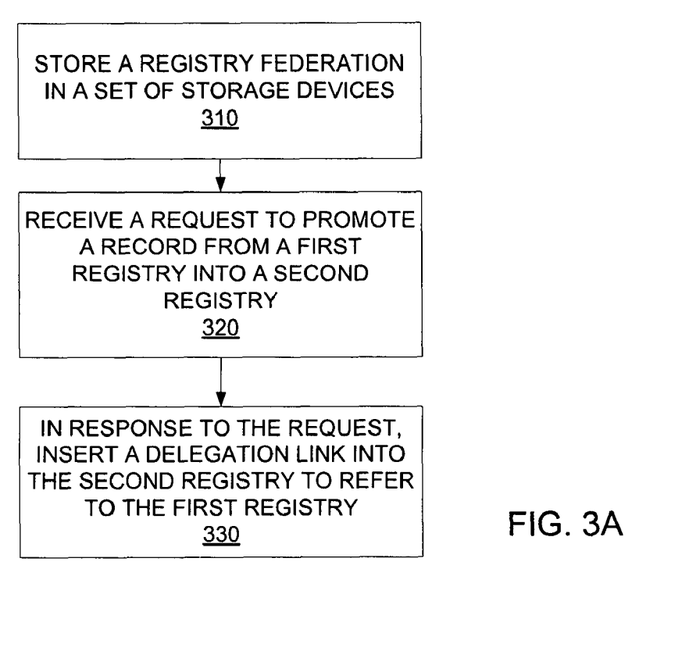
FIG. 3A illustrates a flow diagram of one embodiment of a method to create a link-based registry federation.

FIG. 3A illustrates a flow diagram of one embodiment of a method to create a link-based registry federation. The method may be performed by processing logic that may comprise hardware (e.g., circuitry, dedicated logic, programmable logic, microcode, etc.), software (such as instructions run on a processing device), firmware, or a combination thereof. For instance, the computing system 400 illustrated in FIG. 4 may perform at least part of the method in some embodiments.

Initially, processing logic stores a registry federation of a web service system in a set of storage devices (processing block 310). For example, the registry federation may include UDDI registries. The storage devices may include storage devices internal to a computing system (e.g., hard disk), and/or storage devices external to a computing system (e.g., optical disks, magnetic tapes, etc.).

In some embodiments, processing logic receives a request to promote a record from a first registry into a second registry of the registry federation (processing block 320). The request may be from an administrator of the registry federation, or a user of the registry federation. In response to the request, processing logic inserts a delegation link into the second registry to refer to the first registry (processing block 330). The above operations may be repeated as many times as needed to build a hierarchy of registries affiliated to each other. Furthermore, in some embodiments, a delegation link may refer to a link record, which includes another delegation link referring to another record in another registry. Subsequently, the record in the first registry may need to be updated, which will only require a change to the record in the first registry and not the delegation link in the second registry.

Figure 3B:
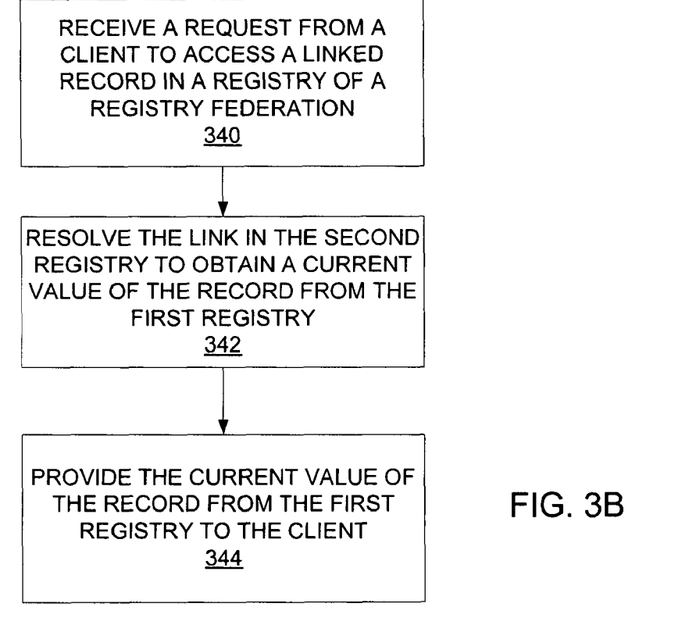
FIGS. 3B-3D illustrate flow diagrams of various embodiments of a method to resolve a delegation link in a link-based registry federation.

FIG. 3B illustrates a flow diagram of one embodiment of a method to resolve a delegation link in a link-based registry federation, such as the one created according to the method shown in FIG. 3A. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic receives a request from a client to access a linked record in a registry of a registry federation (processing block 340). Processing logic may resolve a delegation link of the linked record in the second registry to obtain a current value of the record from the first registry (processing block 342). Then processing logic provides the current value of the record from the first registry to the client (processing block 344).

Figure 3C:
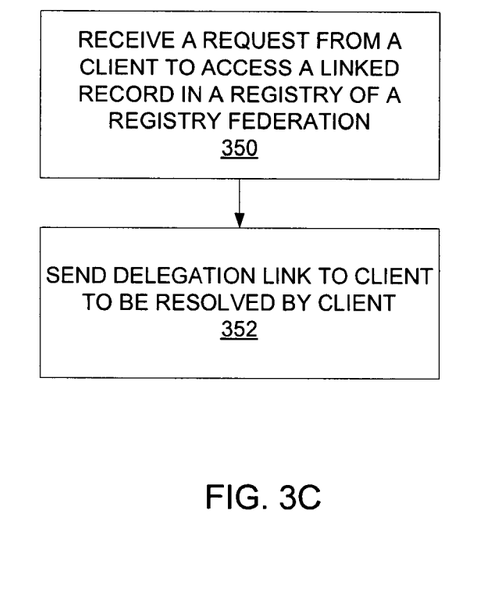

FIG. 3C illustrates a flow diagram of an alternate embodiment of a method to resolve a delegation link in a link-based registry federation. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic receives a request from a client to access a linked record in a registry of a registry federation (processing block 350). In response to the request, processing logic sends the delegation link of the linked record to the client (processing block 352). The client may then resolve the delegation link himself and retrieve a copy of the record referred to by the delegation link.

Figure 3D:
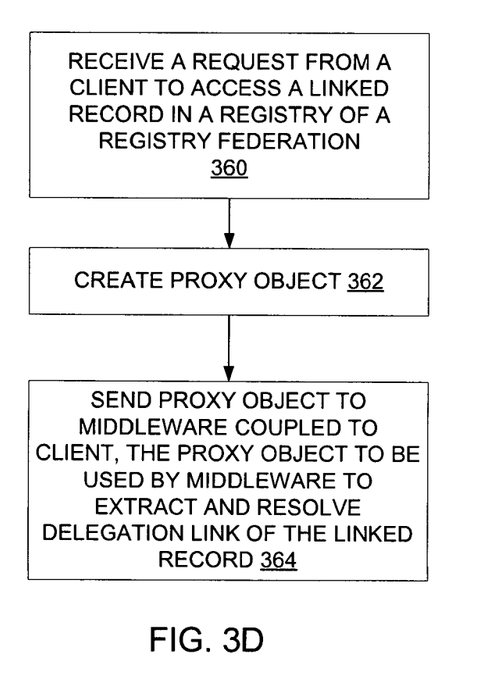

FIG. 3D illustrates a flow diagram of another alternate embodiment of a method to resolve a delegation link in a link-based registry federation. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic receives a request from a client to access a linked record in a registry of a registry federation (processing block 360). The linked record includes a delegation link referring to another record in another registry. Processing logic may create a proxy object (processing block 362). The proxy object provides a set of interfaces to allow middleware to access the registry. Then processing logic sends the proxy object to a middleware coupled to the client (processing block 364). When the client needs to process the information of the linked record, the middleware can extract and resolve the delegation link from the registry using the proxy object to determine where the record referred to by the delegation link is, and then retrieve a copy of the record for the client.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the link-based registry federation manager 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., link-based registry federation manager 422) embodying any one or more of the methodologies or functions described herein. The link-based registry federation manager 422 may also reside, completely or at least partially, within the main memory 404 and/or within the processing device 402 during execution thereof by the computing system 400, the main memory 404 and the processing device 402 also constituting computer-accessible storage media. The link-based registry federation manager 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The link-based registry federation manager 428, components and other features described herein (for example, in relation to FIG. 1) can be implemented as discrete hardware components or integrated into the functionalities of hardware components, such as ASICS, FPGAs, DSPs, or similar devices. In addition, the automatic documentation generator 428 can be implemented as firmware or functional circuitries within hardware devices. Further, the link-based registry federation manager 428 can be implemented in any combination of hardware devices and software components.

Thus, some embodiments of a system and a method to implement a link-based registry federation have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
storing a registry federation in a set of storage devices, the registry federation comprising registries, each of the registries comprising records; and
in response to a request to promote a record of a first registry of the registry federation into a second registry of the registry federation, inserting, by a server coupled to the set of storage devices, a delegation link in the second registry to refer to the record of the first registry without fully replicating the record in the second registry.

2. The method of claim 1, further comprising:
in response to a request from a client to access the record linked in the second registry, resolving, by the server, the delegation link in the second registry to retrieve the record from the first registry, and sending the record to the client.

3. The method of claim 1, further comprising:
in response to a request from a client to access the record linked in the second registry, sending, by the server, the delegation link to the client to allow the client to resolve the delegation link.

4. The method of claim 1, further comprising:
in response to a request from a client to access the record linked in the second registry, sending, by the server, a proxy object to the client, wherein the proxy object is resolved by a middleware coupled between the client and the server to retrieve the record for the client.

5. The method of claim 1, wherein the delegation link comprises a network address of the first registry.

6. The method of claim 1, wherein the record in the first registry comprises a second delegation link to refer to a third registry of the registry federation.

7. The method of claim 1, wherein the registries comprise Universal Description, Discovery, and Integration (UDDI) registries.

8. An apparatus comprising:
a storage interface to communicably couple to a set of storage devices, the set of storage devices storing a registry federation comprising registries, each of the registries comprising records; and
a processing device coupled to the storage interface, to promote a record of a first registry of the registry federation into a second registry of the registry federation by inserting a delegation link in the second registry to refer to the record of the first registry without fully replicating the record in the second registry.

9. The apparatus of claim 8, further comprising:
a network interface communicably coupled to a network, to receive a request from a client coupled to the network to access the record linked in the second registry, wherein, in response to the request, the processing device resolves the delegation link in the second registry to retrieve the record from the first registry, and sends the record to the client.

10. The apparatus of claim 8, further comprising:
a network interface communicably coupled to a network, to receive a request from a client coupled to the network to access the record linked in the second registry, wherein, in response to the request, the processing device sends the delegation link to the client via the network interface to allow the client to resolve the delegation link.

11. The apparatus of claim 8, further comprising:
a network interface communicably coupled to a network, to receive a request from a client coupled to the network to access the record linked in the second registry, wherein, in response to the request, the processing device sends a proxy object to a middleware coupled to the client via the network interface, wherein the proxy object is resolved by the middleware to retrieve the record for the client.

12. The apparatus of claim 8, wherein the delegation link comprises a network address of the first registry.

13. The apparatus of claim 8, wherein the record in the first registry comprises a second delegation link to refer to a third registry of the registry federation.

14. The apparatus of claim 8, further comprising the set of storage devices.

15. The apparatus of claim 8, wherein the registries comprise Universal Description, Discovery, and Integration (UDDI) registries.

16. A system comprising:
a set of one or more storage devices; and
an apparatus comprising:
a storage interface to communicably couple to the set of storage devices, the set of storage devices storing a registry federation comprising registries, each of the registries comprising records, and
a processing device coupled to the storage interface, to promote a record of a first registry of the registry federation into a second registry of the registry federation by inserting a delegation link in the second registry to refer to the record of the first registry without fully replicating the record in the second registry.

17. A non-transitory computer-readable storage medium embodying instructions that, when executed by a processing device, will cause the processing device to perform a method comprising:
storing a registry federation in a set of storage devices, the registry federation comprising registries, each of the registries comprising records; and
in response to a request to promote a record of a first registry of the registry federation into a second registry of the registry federation, inserting, by the processing device, a delegation link in the second registry to refer to the record of the first registry without fully replicating the record in the second registry.

18. The computer-readable storage medium of claim 17, wherein the method further comprises:
in response to a request from a client to access the record linked in the second registry, resolving, by the processing device, the delegation link in the second registry to retrieve the record from the first registry, and sending the record to the client.

19. The computer-readable storage medium of claim 17, wherein the method further comprises:
in response to a request from a client to access the record linked in the second registry, sending, by the processing device, the delegation link to the client to allow the client to resolve the delegation link.

20. The computer-readable storage medium of claim 17, wherein the method further comprises:
in response to a request from a client to access the record linked in the second registry, sending, by the processing device, a proxy object to the client, wherein the proxy object is resolved by a middleware coupled between the client and the processing device to retrieve the record for the client.

21. The computer-readable storage medium of claim 17, wherein the delegation link comprises a network address of the first registry.

22. The computer-readable storage medium of claim 17, wherein the record in the first registry comprises a second delegation link to refer to a third registry of the registry federation.

23. The computer-readable storage medium of claim 17, wherein the registries comprise Universal Description, Discovery, and Integration (UDDI) registries.

* * * * *